US008359204B2

(12) United States Patent
Gupta

(10) Patent No.: US 8,359,204 B2
(45) Date of Patent: Jan. 22, 2013

(54) FREE-SPEECH COMMAND CLASSIFICATION FOR CAR NAVIGATION SYSTEM

(75) Inventor: Rakesh Gupta, Mountain View, CA (US)

(73) Assignee: Honda Motor Co., Ltd., Tokyo (JP)

(*) Notice: Subject to any disclaimer, the term of this patent is extended or adjusted under 35 U.S.C. 154(b) by 875 days.

(21) Appl. No.: 12/259,196

(22) Filed: Oct. 27, 2008

(65) Prior Publication Data

US 2009/0112605 A1    Apr. 30, 2009

Related U.S. Application Data

(60) Provisional application No. 60/983,065, filed on Oct. 26, 2007, provisional application No. 61/015,515, filed on Dec. 20, 2007.

(51) Int. Cl.
*G10L 21/00* (2006.01)
(52) U.S. Cl. ........................................ 704/275; 704/270
(58) Field of Classification Search .................. 704/270, 704/275
See application file for complete search history.

(56) References Cited

U.S. PATENT DOCUMENTS

| | | | |
|---|---|---|---|
| 4,501,012 A | 2/1985 | Kishi et al. | |
| 4,593,403 A | 6/1986 | Kishi et al. | |
| 5,214,707 A | 5/1993 | Fujimoto et al. | |
| 5,420,912 A * | 5/1995 | Kopp et al. | 455/563 |
| 5,852,804 A | 12/1998 | Sako et al. | |
| 6,182,046 B1 * | 1/2001 | Ortega et al. | 704/275 |
| 6,301,560 B1 * | 10/2001 | Masters | 704/251 |
| 6,347,300 B1 * | 2/2002 | Minematsu | 704/270 |
| 6,385,535 B2 | 5/2002 | Ohishi et al. | |
| 6,732,077 B1 | 5/2004 | Gilbert et al. | |
| 6,778,963 B2 | 8/2004 | Yamamoto et al. | |
| 6,922,670 B2 * | 7/2005 | Yamada et al. | 704/270.1 |
| 6,937,986 B2 * | 8/2005 | Denenberg et al. | 704/275 |
| 7,024,363 B1 * | 4/2006 | Comerford et al. | 704/270 |
| 7,177,817 B1 * | 2/2007 | Khosla et al. | 704/275 |
| 7,184,957 B2 | 2/2007 | Brookes et al. | |
| 7,197,460 B1 * | 3/2007 | Gupta et al. | 704/270.1 |

(Continued)

FOREIGN PATENT DOCUMENTS

EP    1 408 303 A1    4/2004
EP    1 884 421 B1    10/2008

(Continued)

OTHER PUBLICATIONS

PCT International Search Report and Written Opinion, PCT/US2008/081377, Dec. 19, 2008, 9 Pages.

(Continued)

*Primary Examiner* — Douglas Godbold
(74) *Attorney, Agent, or Firm* — Fenwick & West LLP; Mark E. Duell

(57) ABSTRACT

The present invention provides a system and method associating the freeform speech commands with one or more predefined commands from a set of predefined commands. The set of predefined commands are stored and alternate forms associated with each predefined command are retrieved from an external data source. The external data source receives the alternate forms associated with each predefined command from multiple sources so the alternate forms represent paraphrases of the predefined command. A representation including words from the predefined command and the alternate forms of the predefined command, such as a vector representation, is generated for each predefined command. A similarity value between received speech data and each representation of a predefined command is computed and the speech data is classified as the predefined command whose representation has the highest similarity value to the speech data.

27 Claims, 4 Drawing Sheets

U.S. PATENT DOCUMENTS

| | | | |
|---|---|---|---|
| 7,272,212 B2* | 9/2007 | Eberle et al. | 379/88.17 |
| 7,292,978 B2* | 11/2007 | Endo et al. | 704/243 |
| 7,299,187 B2* | 11/2007 | Tahara et al. | 704/275 |
| 7,349,851 B2* | 3/2008 | Zuberec et al. | 704/270 |
| 7,356,187 B2 | 4/2008 | Shanahan et al. | |
| 7,356,461 B1* | 4/2008 | Tremblay et al. | 704/9 |
| 7,447,635 B1* | 11/2008 | Konopka et al. | 704/275 |
| 7,457,808 B2* | 11/2008 | Gaussier et al. | 1/1 |
| 7,480,619 B1* | 1/2009 | Scott | 704/275 |
| 7,555,431 B2* | 6/2009 | Bennett | 704/255 |
| 7,788,099 B2* | 8/2010 | Haubold et al. | 704/270 |
| 7,899,673 B2* | 3/2011 | Brown | 704/270 |
| 7,912,186 B2* | 3/2011 | Howell et al. | 379/88.04 |
| 2002/0116174 A1* | 8/2002 | Lee et al. | 704/9 |
| 2003/0004730 A1* | 1/2003 | Yuschik | 704/275 |
| 2004/0143440 A1 | 7/2004 | Prasad et al. | |
| 2004/0148170 A1* | 7/2004 | Acero et al. | 704/257 |
| 2004/0181407 A1* | 9/2004 | Trinkel et al. | 704/250 |
| 2004/0181414 A1* | 9/2004 | Pyle et al. | 704/275 |
| 2004/0193426 A1* | 9/2004 | Maddux et al. | 704/275 |
| 2004/0236580 A1* | 11/2004 | Bennett | 704/270.1 |
| 2005/0080632 A1 | 4/2005 | Edno et al. | |
| 2005/0165609 A1* | 7/2005 | Zuberec et al. | 704/270 |
| 2005/0216271 A1* | 9/2005 | Konig | 704/275 |
| 2006/0167696 A1* | 7/2006 | Chaar et al. | 704/270 |
| 2006/0215821 A1* | 9/2006 | Rokusek et al. | 379/88.01 |
| 2006/0217962 A1* | 9/2006 | Asano | 704/4 |
| 2006/0235842 A1* | 10/2006 | Szekely et al. | 707/5 |
| 2007/0005340 A1* | 1/2007 | Goutte et al. | 704/9 |
| 2007/0005368 A1 | 1/2007 | Chutorash et al. | |
| 2007/0005370 A1* | 1/2007 | Elshout | 704/275 |
| 2007/0136048 A1* | 6/2007 | Richardson-Bunbury et al. | 704/9 |
| 2007/0288230 A1* | 12/2007 | Datta | 704/9 |
| 2008/0059187 A1* | 3/2008 | Roitblat et al. | 704/257 |
| 2008/0059195 A1* | 3/2008 | Brown | 704/270 |
| 2008/0133244 A1* | 6/2008 | Bodin et al. | 704/275 |
| 2008/0133245 A1* | 6/2008 | Proulx et al. | 704/277 |
| 2008/0208590 A1* | 8/2008 | Cross et al. | 704/275 |
| 2008/0273220 A1* | 11/2008 | Couchman | 358/1.15 |
| 2009/0037175 A1* | 2/2009 | Wang et al. | 704/251 |

FOREIGN PATENT DOCUMENTS

| | | |
|---|---|---|
| JP | 2005-149481 A | 6/2005 |
| JP | 2005-316996 A | 11/2005 |
| JP | 2006-85381 A | 3/2006 |

OTHER PUBLICATIONS

Piotrowski, E., "How Ford Sync Works" How Stuff Works, Inc., Last updated on Oct. 30, 2008, [online] [Retrieved on Nov. 9, 2009] Retrieved from the internet <URL: http://auto.howstuffworks.com/ford-sync.htm>.

Japanese Patent Office, Non-Final Office Action, Japanese Patent Application No. 2010-529323, mailed Sep. 11, 2012, 6 pages (with English translation).

Japanese Patent Office, Non-Final Office Action, Japanese Patent Application No. 2010-531320, mailed Oct. 23, 2012, 9 pages.

* cited by examiner

FREE-SPEECH COMMAND CLASSIFICATION FOR CAR NAVIGATION SYSTEM

RELATED APPLICATIONS

This application claims priority, under 35 U.S.C. §19(e), from U.S. provisional application No. 60/983,065, filed on Oct. 26, 2007, and U.S. provisional application No. 61/015,515, filed on Dec. 20, 2007, which are incorporated by reference herein in their entirety.

FIELD OF THE INVENTION

This invention relates generally to speech data classification, and more particularly to a system and method for using external data to improve speech data classification by a vehicular navigation system.

BACKGROUND OF THE INVENTION

Vehicular navigation systems and portable navigation systems and have become increasingly common. These navigation systems allow users to receive directions to different locations and may also allow users to interact with other vehicular systems, such as a climate control system or an audio system. Many vehicular navigation systems have now been configured to receive speech data and perform an action responsive to the received speech data. Hence, by speaking commands, a vehicle occupant can prompt the vehicle navigation system to find a location, such as the nearest gas station or a spoken address, or can prompt the vehicle navigation system to adjust the temperature within the vehicle or change a radio station currently played within the vehicle.

However, conventional vehicular navigation systems only recognize a specific number of predefined commands, such as "find nearest ATM" or "radio next station." Because these predefined commands have a specific format, such as a specific grammatical format, users are required to memorize the specific format of the predefined commands to interact with a vehicular navigation system. However, many users do not have the time to review a list of the predefined commands recognized by a conventional vehicular navigation system, much less time to memorize the format of the predefined commands which are recognized by the conventional vehicular navigation system.

Because many users rely on trial and error or dealer demonstrations to learn how to use a conventional vehicular navigation system, many users do not know the commands which are recognized by the conventional vehicular navigation system and quickly become frustrated with the conventional vehicular navigation system. Despite limited training on use of a conventional vehicular navigation system, users frequently stop using the conventional vehicular navigation system if the vehicular navigation system does not work properly during initial use.

Further, because the predefined commands recognized by conventional vehicular navigation systems have a specific format and users are generally unfamiliar with the specific format expected by the vehicular navigation system, generally only half of the speech data received by the vehicular navigation system is identified as a predefined command which causes a desired action. One fourth of the speech data received by a conventional vehicular navigation system is incorrectly interpreted, causing the vehicular navigation system to perform an action other than the user-desired action or no action. The remaining one fourth of the received speech data is generally not recognized by a conventional vehicular navigation system causing no action to be taken by the vehicular navigation system. Hence, the limited ability of conventional vehicular navigation systems to identify speech data having a specific format, conventional vehicular navigation systems have high rates of classification errors or non-recognition of user provided speech data, leading to user dissatisfaction with the conventional vehicular navigation system.

Thus, what is needed is a system and method for accurately associating freeform commands with corresponding vehicle navigation commands.

SUMMARY OF THE INVENTION

The present invention provides a system and method for receiving speech commands in a variety of formats, or "freeform speech commands," and associating the freeform speech commands with a predefined command from a set of predefined commands. The set of predefined commands are stored and alternate forms associated with each of the predefined commands are retrieved from an external data source. In one embodiment, the external data source receives the alternate forms associated with each predefined command from multiple sources, such as from multiple users, so that the alternate forms represent paraphrases or alternative ways of communicating the predefined command. A representation, such as a vector representation, is generated for each predefined command which includes words comprising the predefined command and words comprising the alternate forms of the predefined command. This allows the representation of a predefined command to include different words which are associated with the predefined command by one or more users. A similarity value between received speech data and the representation of representation of each predefined command is computed, and the speech data is associated with the predefined command whose representation has the highest similarity value, allowing a vehicular navigation system to perform an action associated with the predefined command associated with the speech data.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

Figure 1:
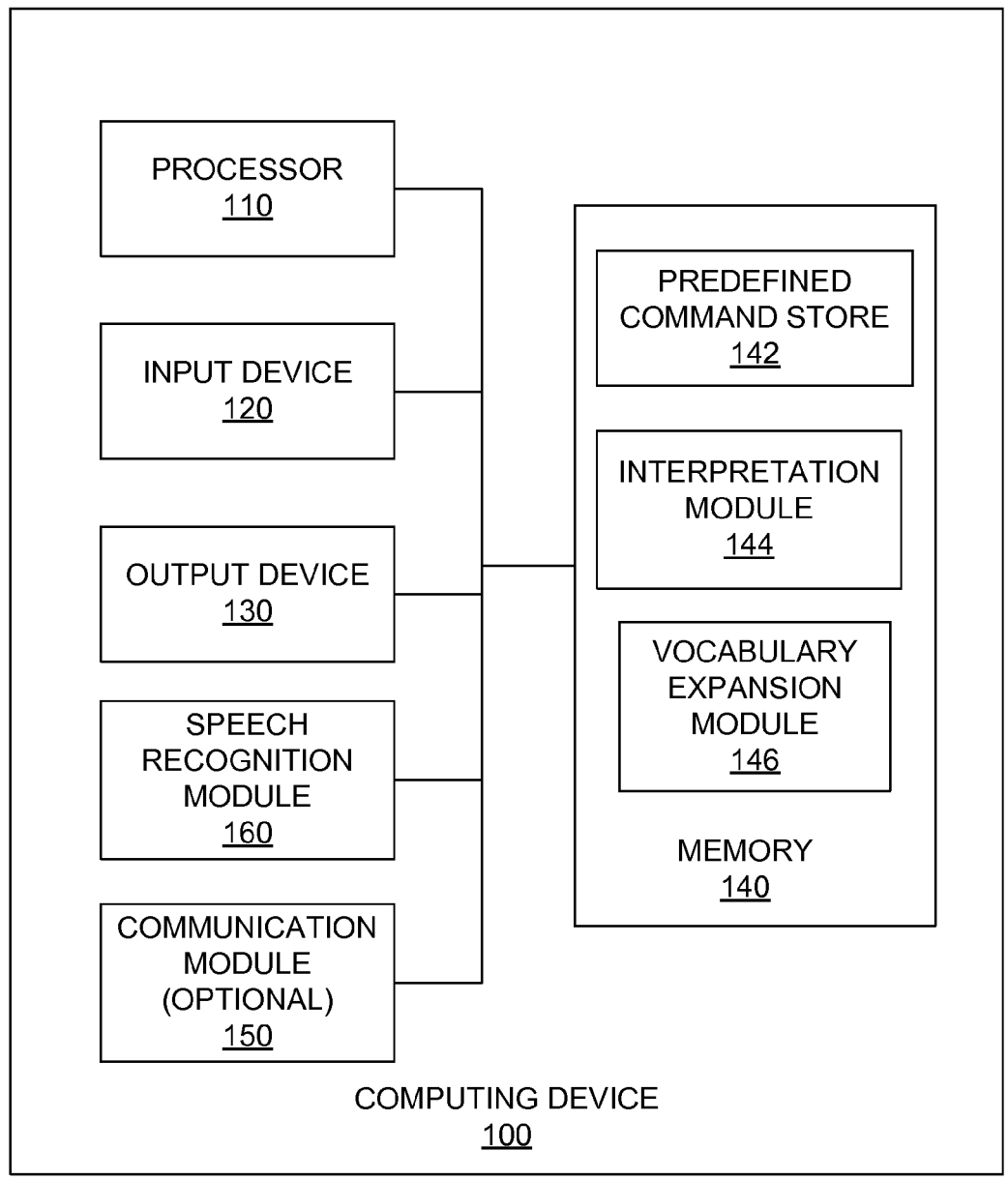
FIG. 1 is an illustration of a computing device in which one embodiment of the present invention operates.

A preferred embodiment of the present invention is now described with reference to the Figures where like reference numbers indicate identical or functionally similar elements. Also in the Figures, the left most digits of each reference number correspond to the Figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

FIG. 1 is an illustration of a computing device 100 in which one embodiment of the present invention may operate. The computing device 100 comprises a processor 110, an input device 120, an output device 130, a speech recognition module 160 and a memory 140. In an embodiment, the computing device 100 further comprises a communication module 150 including transceivers or connectors.

The processor 110 processes data signals and may comprise various computing architectures including a complex instruction set computer (CISC) architecture, a reduced instruction set computer (RISC) architecture, or an architecture implementing a combination of instruction sets. Although only a single processor is shown in FIG. 1, multiple processors may be included. The processor 110 comprises an arithmetic logic unit, a microprocessor, a general purpose computer, or some other information appliance equipped to transmit, receive and process electronic data signals from the memory 140, the input device 120, the output device 130 or the communication module 150.

The input device 120 is any device configured to provide user input to the computing device 100, such as a cursor controller or a keyboard. In one embodiment, the input device 120 can include an alphanumeric input device, such as a QWERTY keyboard, a key pad or representations of such created on a touch screen, adapted to communicate information and/or command selections to processor 110 or memory 140. In another embodiment, the input device 120 is a user input device equipped to communicate positional data as well as command selections to processor 110 such as a joystick, a mouse, a trackball, a stylus, a pen, a touch screen, cursor direction keys or other mechanisms to cause movement adjustment of an image.

The output device 130 represents any device equipped to display electronic images and data as described herein. Output device 130 may be, for example, an organic light emitting diode display (OLED), liquid crystal display (LCD), cathode ray tube (CRT) display, or any other similarly equipped display device, screen or monitor. In one embodiment, output device 120 is equipped with a touch screen in which a touch-sensitive, transparent panel covers the screen of output device 130.

The memory 140 stores instructions and/or data that may be executed by processor 110. The instructions and/or data may comprise code for performing any and/or all of the techniques described herein. Memory 140 may be a dynamic random access memory (DRAM) device, a static random access memory (SRAM) device, Flash RAM or other non-volatile storage device, combinations of the above, or some other memory device known in the art. The memory 140 comprises a predefined command store 142, an interpretation module 144 and a vocabulary expansion module 146, and is adapted to communicate with the processor 110, the input device 120, the output device 130, the speech recognition module 160 and/or the communication module 150.

The predefined command store 142 includes text data describing one or more predefined commands which cause the computing device 100 to interact with and modify one or more vehicle systems. The stored predefined commands have a specific format, such as a defined grammatical structure specifying one or more words and order associated with the one or more words. For example, the stored predefined commands comprise commands such as "temperature up," "find nearest ATM," "find nearest bank," "radio seek up" or other phrases of one or more words in a specific order.

In one embodiment, the predefined command store 142 associates predefined commands with a high-level category. In one embodiment, the high-level categories describe types of functions performed by the predefined commands within the high-level category or describe a vehicular system which is modified by execution of the commands within the high-level category. For example, the predefined categories are "Global Commands," "Navigation General," "Navigation Display," "Find Places," "Climate," "Temperature," "Setup," "Radio," "Compact Disc (CD)," "Information" and "MP3." For example, commands within the "Climate" high-level category cause modification of the vehicle climate control system when identified. Alternatively, the predefined categories organize commands according to user-defined categories or other preferences. In one embodiment the predefined command store 142 modifies the organization of commands into categories responsive to input received from the input device 120 or speech recognition module 160. For example, responsive to an input, the predefined command store 142 modifies the command "display map" from being associated with the "Global Commands" high-level category to being associated with the "Navigation Display" high-level category. In one embodiment, after associating a high-level category with a command, the predefined command store 142 performs additional classification of commands within the high-level category. For example, the predefined command store 142 concatenates a sequence of simple classifiers where the output of the first classifier is selected from a set of labels associated with the high-level categories.

The interpretation module 144 communicates with the predefined command store 142, the vocabulary expansion module 146 and the speech recognition module 160 to associate received speech data with a predefined command from the predefined command store 142 for execution by the computing system 100. Responsive to receiving speech data from the speech recognition module 160, the interpretation module 144 accesses the vocabulary expansion module 146, which is further described below, and the predefined command store 142 associated the received speech data with a predefined command.

For example, a vehicle navigation system is initially designed to recognize and perform an action responsive to 321 predefined commands which are stored in the predefined command store 142. The interpretation module 144 accesses these 321 predefined commands to from the predefined command store 142 and data from the vocabulary expansion module 146 associated with the predefined commands to determine whether the speech data is associated with a predefined command. The interpretation module 144 uses the relationships between data in the predefined command store 142 and the vocabulary expansion module 146 to associate subsequently received speech commands with a predefined command. Interaction with the vocabulary expansion module 146 enables the interpretation module 144 to associated speech data, which is received in a format different than the predefined command, with a predefined command most similar to the received speech data commands. The interpretation module 144 is further described in conjunction with FIG. 4.

The vocabulary expansion module 146 includes alternate forms of the commands included in the predefined command store 142. These alternate forms describe different grammatical structures having a similar meaning than the predefined commands, variations of the predefined commands or synonyms for words included in the stored predefined commands. For example, for the predefined command "find the nearest ATM," the vocabulary expansion module 146 includes alternate forms, such as "where is the closest ATM machine," "find closest automatic teller," "locate closest ATM," "go to the nearest cash machine," "I need a money machine" or "locate ATM." While conventional vehicle navigation systems are only capable of identifying the predefined of "find the nearest ATM" in the above example, the vocabulary expansion module 146 allows the interpretation module 142 to access alternate forms of "find the nearest ATM" and determine whether received speech is similar to an alternate form of "find the nearest ATM," enabling the interpretation module 142 to identify the command of "find the nearest ATM" using an alternate form of the predefined command. Hence, the vocabulary expansion module 146 allows the interpretation module 144 to identify predefined commands upon receiving speech data associated with an alternate form of a predefined command included in the vocabulary expansion module 146. Hence, the vocabulary expansion module 146 allows a vehicle occupant to provide speech commands in different grammatical formats or using synonyms for the words comprising a predefined command, simplifying interaction with the computing device 100 by increasing the amount of speech data which can be used to identify a predefined command.

In one embodiment, the alternate grammatical formats and synonyms are received from various sources via the communication module 150, further described below, and communicated to the vocabulary expansion module 146, allowing use of distributed capture techniques to receive diverse alternate grammatical formats and/or synonyms from. By using distributed capture techniques, the vocabulary expansion module 146 receives a wide variety of alternative grammatical formats and/or synonyms from various sources. For example, the communication module 150 receives alternative grammatical formats for commands from an external data source, such as the OpenMind Indoor Common Sense database available at http://openmind.hri-us.com, which includes data from one or more users describing alternate grammatical formats and/or alternative phrases associated with one or more stored predefined commands. In an embodiment, the vocabulary expansion module 146 also receives data from one or more lexical databases, such as the WordNet database, via the communication module 150 to retrieve synonyms for words comprising commands in the predefined command store 142.

In an embodiment, the computing device 100 further comprises a communication module 150 which links the computing device 100 to a network (not shown), or to other computing devices 100. The network may comprise a local area network (LAN), a wide area network (WAN) (e.g. the Internet), and/or any other interconnected data path across which multiple devices man communicate. In one embodiment, the communication module 150 is a conventional connection, such as USB, IEEE 1394 or Ethernet, to other computing devices 100 for distribution of files and information. In another embodiment, the communication module 150 is a conventional type of transceiver, such as for infrared communication, IEEE 802.11a/b/g/n (or WiFi) communication, Bluetooth® communication, 3G communication, IEEE 802.16 (or WiMax) communication, or radio frequency communication.

The computing device 100 also includes a speech recognition module 160 which converts received audio data into a format readable by the computing device 100, such as text data. The output of the speech recognition module 160 is communicated to the predefined command store 142 and/or the vocabulary expansion module 146 for subsequent processing. In one embodiment, the speech recognition module 160 includes a microphone or other audio capture device to receive audio data, such as spoken words, from a user, such as a vehicle occupant. In one embodiment, the speech recognition module 160 uses Hidden Markov Model (HMM) based speech recognition to identify audio data. However, in other embodiments, the speech recognition module 160 may use any suitable method to capture audio data and to convert the captured audio data to a format for use by the predefined command store 142, the interpretation module 144 and/or the vocabulary expansion module 146.

It should be apparent to one skilled in the art that computing device 100 may include more or less components than those shown in FIG. 1 without departing from the spirit and scope of the present invention. For example, computing device 100 may include additional memory, such as, for example, a first or second level cache, or one or more application specific integrated circuits (ASICs). Similarly, computing device 100 may include additional input or output devices. In some embodiments of the present invention one or more of the components (110, 120, 130, 140, 142, 144, 146, 150, 160) can be positioned in close proximity to each other while in other embodiments these components can be positioned in geographically distant locations. For example the units in memory 140 can be programs capable of being executed by one or more processors 110 located in separate computing devices 100.

Figure 2:
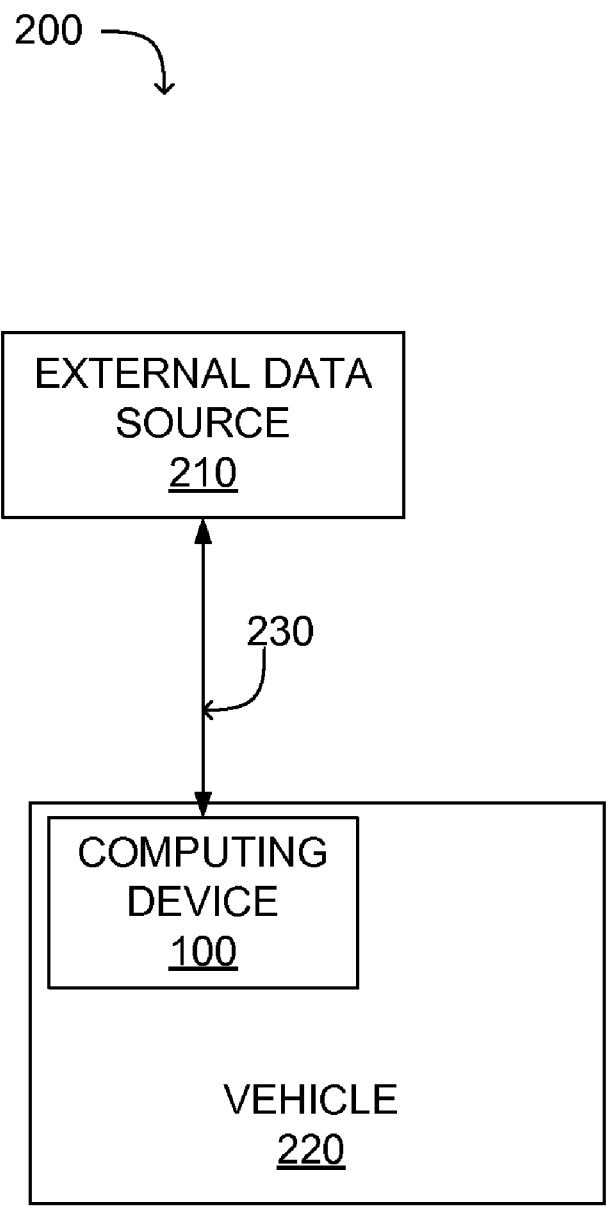
FIG. 2 is a block diagram of a system for expanding the vocabulary of a vehicular navigation system according to one embodiment of the present invention.

FIG. 2 is a block diagram of a system 200 for expanding the vocabulary of a vehicular navigation system according to one embodiment of the present invention. For purposes of illustration, FIG. 2 shows a computing device 100 receiving data from a single external data source 210; however, in other embodiments, the computing device 100 receives data from a plurality of external data sources 210.

The computing device 100 is included in a vehicle 220 and communicates with the external data source 210 via communication link 230. In one embodiment, the computing device 100 is a navigation system embedded in the vehicle and interacts with one or more vehicle systems, such as a climate control system, a temperature sensor, an audio system (e.g., a radio, a compact disc player, an MP3 player or another system which plays audio data). Alternatively, the computing device 100 is a portable navigation system which communicates with one or more systems within the vehicle 220 and can also be removed from the vehicle 220 for use outside of the vehicle 220.

The external data source 210 is a data storage device including structured data describing one or more activities, such as the OpenMind Indoor Common Sense website available at http://openmind.hri-us.com. In one embodiment, the external data source 210 includes data received from one or more volunteers which describes alternate forms of the predefined commands stored by the predefined command store 142 in the computing device 100. For example, the external data source 210 presents a template to one or more users including a predefined command and queries the one or more users to provide alternate formats for the predefined command. In one embodiment, the external data source 210 also receives and stores data from one or more users or from one or more data repositories describing synonyms for one or more words comprising the predefined command. Hence, the external data source 210 captures alternative formats and/or synonyms associated with one or more predefined commands to increase the number and type of speech data that can be associated with the one or more predefined commands.

The communication link 230 communicates data between the external data source 210 and the communication module 150 included in the computing device 100. In one embodiment, the communication link 230 comprises a wireless communication channel, such as general packet radio service (GPRS), IEEE 802.11 (or WiFi), IEEE 802.16 (or WiMax), Bluetooth, or any other suitable wireless communication channel. Alternatively, the communication link 230 comprises a conventional wired data communication system, such as Ethernet, digital subscriber line (DSL), integrated services digital network (ISDN), or any other suitable wired communication system. In an embodiment, the communication link 230 comprises a combination of a wireless communication system and a wired communication system. Hence, the communication link 230 allows the external data source 210 to communicate data describing alternate formats and/or synonyms associated with predefined commands to the computing device 100 for storage in the vocabulary expansion module 146. In one embodiment, the communication link 230 is established periodically or responsive to user input to allow updating of the vocabulary expansion module 146 with additional alternate formats or synonyms.

Figure 3:
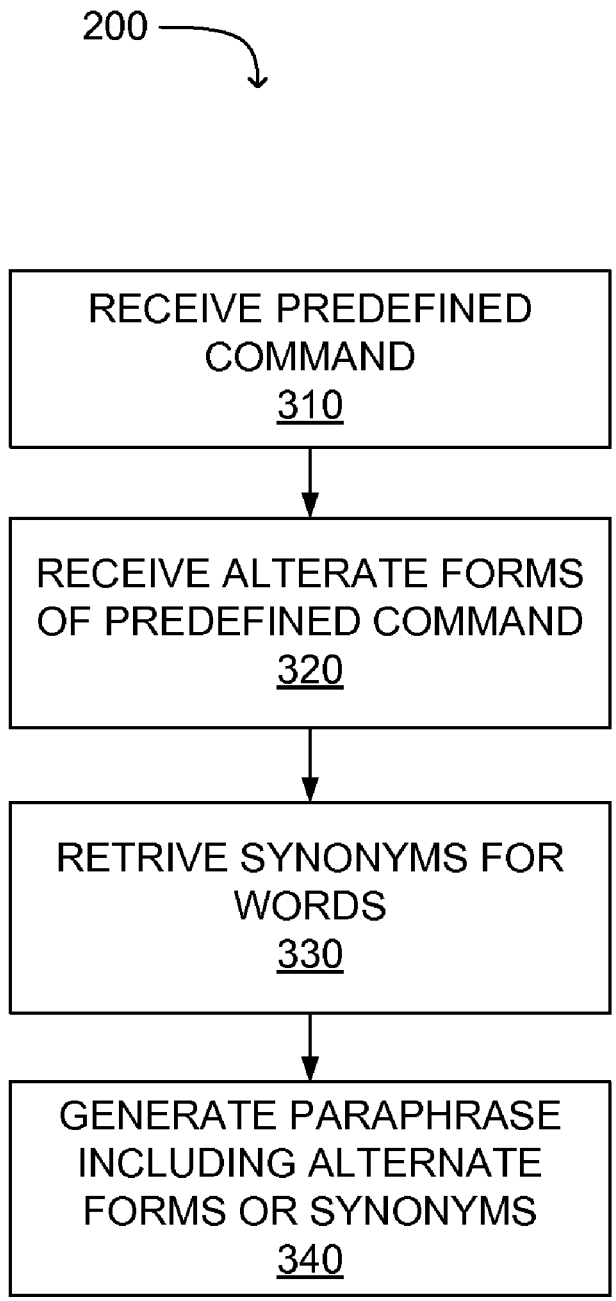
FIG. 3 is a flowchart illustrating a method for vocabulary expansion of identifiable speech data according to one embodiment of the present invention.

FIG. 3 is a flowchart illustrating a method 300 for expanding the vocabulary of a vehicular navigation system according to one embodiment of the present invention. In an embodiment, the steps of the method 300 are implemented by the processor 110 executing software or firmware instructions that cause the described actions. Those of skill in the art will recognize that one or more of the methods may be implemented in embodiments of hardware and/or software or combinations thereof. For example, instructions for performing the described actions are embodied or stored within a computer readable medium. Furthermore, those of skill in the art will recognize that other embodiments can perform the steps of FIG. 3 in different orders. Moreover, other embodiments can include different and/or additional steps than the ones described here.

Initially, a predefined command is received 310 by the external data source 210. In one embodiment, the external data source 210 receives 310 the predefined command from the predefined command store 142 included in the computing device 100 via communication link 230. Alternatively, the external data source 210 receives 310 the predefined command from a set of predefined commands locally stored by the external data source 210.

Alternate forms associated with the predefined command are then received 320 by the external data source 210. In one embodiment, external data source 210 presents the predefined command to multiple users, such as by visually displaying the predefined command on a display device, and queries the multiple users for alternate forms which users associate with the predefined command. For example, to receive 320 alternate forms for the predefined command "find nearest ATM,"

the external data source displays the query "In a car, instead of 'find nearest ATM,' one might say:" on a display device and receives input from one or more users describing words or phrases, such as "locate closest ATM," "go to nearest cash machine" or "show the closest ATM," representing alternate forms that one or more users associate with "find nearest ATM." Hence, the alternate forms represent different expressions or phrases which one or more users associate with the predefined command received 310 by the external data source 210. Alternatively, the external data source receives 320 alternate forms associated with the predefined command by accessing one or more databases, or other storage devices, including include one or more words or phrases.

In one embodiment, the external data source 210 also retrieves 330 synonyms for words included in the predefined command and/or words included in one or more alternate forms associated with the predefined command. For example, the external data source 210 parses the predefined command, or an alternate form associated with the predefined command, into one or more words, and then accesses a lexical database, such as the WordNet database, to retrieve 330 synonyms for the different words. Alternatively, after parsing the predefined command or alternate form of the predefined command into words, the external data source queries one or more users to provide synonyms for the different words.

In one embodiment, the external data source generates 340 paraphrases describing the alternate forms and/or synonyms associated with the predefined commands. For example, the external data source 210 stores the alternate forms associates with the predefined commands. In an embodiment, the external data source 210 also generates 340 a paraphrase by replacing one or more words in a predefined command with a retrieved synonym and stores the modified predefined command. In another embodiment, the external data source 210 also modifies an alternate form of a predefined command by replacing one or more words in an alternate form associated with the predefined command with a retrieved synonym and stores the modified alternate form associated with the predefined command.

In an embodiment, the alternate forms associated with the predefined commands are also pre-processed as the paraphrases are generated 340. Pre-processing allows the collected alternate forms associated with the predefined commands to more closely resemble the format in which data is received from the speech recognition module 160. For example, the term "ATM" is pre-processed and stored by the external data source 210 as "A T M," as the term is spoken as three distinct letters. Similar pre-processing is applied to other terms to permit storage in a format consistent with how they are received as speech data. In one embodiment a high-level category is also associated with the alternate forms of the predefined commands so that the alternate forms of the predefined commands are associated with high-level categories specified by the predefined command store 142. Hence, each alternate form of a predefined command is associated with a predefined command and may optionally also be associated with a high-level category.

The method 300 allows the external data source 210 to collect and store alternate forms associated with predefined commands representing alternative ways in which a user may speak a predefined command, allowing the external data source 210 to describe additional ways in which users may speak the predefined commands. This enables the external data source 210 to simplify interaction with the computing device 100, by allowing the computing device 100 to identify a predefined command responsive to receiving speech data having one or more alternate forms associated with a predefined command.

Figure 4:
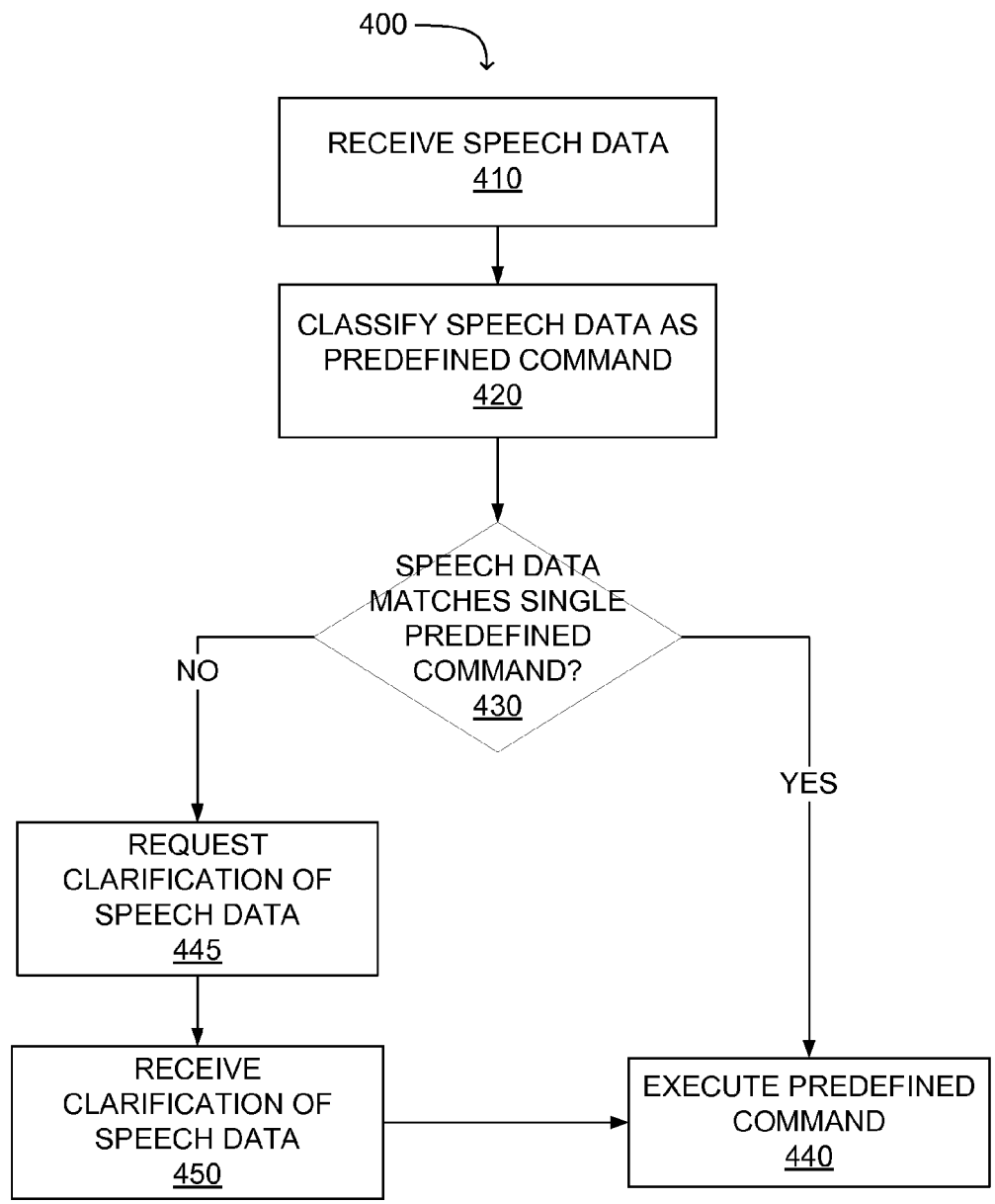
FIG. 4 is a flowchart illustrating a method for classifying received speech commands according to one embodiment of the present invention.

FIG. 4 is a flowchart illustrating a method 400 for classifying received speech commands according to one embodiment of the present invention. In an embodiment, the steps of the method 400 are implemented by the processor 110 executing software or firmware instructions that cause the described actions. Those of skill in the art will recognize that one or more of the methods may be implemented in embodiments of hardware and/or software or combinations thereof. For example, instructions for performing the described actions are embodied or stored within a computer readable medium. Furthermore, those of skill in the art will recognize that other embodiments can perform the steps of FIG. 4 in different orders. Moreover, other embodiments can include different and/or additional steps than the ones described here.

Initially, the speech recognition module 160 receives 410 speech data. In an embodiment, the speech recognition module 160 converts the received speech data into text data for subsequent processing by the interpretation module 144. The speech data, or text data generated from the speech data, is then communicated to the interpretation module 144 where it is classified 420 as a predefined command. In an embodiment, the interpretation module 144 classifies 420 received speech data using multi-class classification methods. For example, the speech data compared to each of the predefined commands included in the predefined command store 142 accounting for and alternate forms associated with the predefined commands that are included in the vocabulary expansion module 146 to determine the probabilities that the speech data corresponds to each predefined command. Based on the determined probabilities, the speech data is classified 420 as the predefined command having the highest probability of including the speech data. In different embodiments, the interpretation module 144 uses different multi-category classification methods to classify 420 the speech data, examples of multi-category classification methods are further described below.

In one embodiment, to classify 420 the speech data, the term frequency-inverse document frequency (TFIDF) weight for each word associated with a predefined command is generated, allowing each category to be represented by a sparse vector. Hence, for each of the predefined commands, the words which comprise the predefined command and the words which comprise alternate representations of the predefined command are identified and the TFIDF weight is computed for each word according to:

$$TF_{t,c} = \begin{cases} 1 + \log(tf_{t,c}) & \text{if } tf_{t,c} > 0 \\ 0 & \text{otherwise} \end{cases}$$

Where $tf_{t,c}$ denotes the term frequency of the word t in the category c. However, in an embodiment the inverse document frequency component is not used because it has a value of zero for words appearing in all categories (e.g., words common to multiple predefined commands), which would make the final result zero. The TFIDF weights are used to generate a vector representation of each predefined command which includes words from the predefined command and words from one or more alternate forms associated with the predefined command. Hence, the vector representation of a predefined command includes a plurality of words included in the predefined command and/or words included in an alternate form associated with the predefined command. The vector representation indicates how frequently different words are associated with the predefined command. After generating a vector representation associated with each predefined command, a vector representation of the speech data is generated and the cosine vector similarity between the vector representation of the speech data and the vector representation of each predefined command is generated. The predefined command is then classified 420 as the predefined command having the largest cosine vector similarity.

Alternatively, the interpretation module 144 uses a Naïve Bayes model to classify 420 the received speech data as a predefined command. In a Naïve Bayes model, the interpretation module 144 models each word in a vector representation of a predefined command as independently contributing to classification of the speech data as a predefined command according to the relationships:

$$P(c \mid t_1, \ldots, t_n) = \frac{1}{Z} P(c) \prod_{i=1}^{n} P(t_i \mid c)$$

$$P(t_i \mid c) = \frac{\text{Count}(t_i \text{ in } c) + 1}{\text{Count}(\text{all terms in } c) + \text{Count}(\text{unique terms})}$$

Where $t_i$ represents the words within a representation of a predefined command. c represents a predefined command and Z represents a scaling factor. Hence, the Naïve Bayes model classifies 420 the speech data as the predefined command by determining which predefined command has the highest probability of including the speech data.

In another embodiment, the interpretation module 144 uses Generative Modeling to compute the probability of each predefined command generating the speech data using a unigram model:

$$P_{uni}(t_1, t_2, t_3, t_4) = P(t_1)P(t_2)P(t_3)P(t_4)$$

Where $t_i$ represents a word. For example, if the speech data generates corresponding text data of "turn radio on," the unigram model for computing probability of the speech data is:

$$P(\text{turn radio on}) = P(\text{turn})P(\text{radio})P(\text{on})$$

In computing the probability, mixing between predefined command and the entire collection of predefined commands is used with the parameter $\lambda$ used to modify the amount of mixing according to the relationship:

$$\hat{P}(t \mid c) = \lambda \hat{P}_{mle}(t \mid M_c) + (1-\lambda) \hat{P}_{mle}(t \mid M_{collection})$$

To optimize performance when a Generative Language method is used, equal mixing between predefined commands and collections of predefined commands is used by setting $\lambda$ equal to 0.5.

Maximum likelihood estimation is used to estimate each term for a predefined command and for the collection of predefined commands according to:

$$\hat{P}(q \mid M_c) = \prod_{t \in query} \hat{P}_{mle}(t \mid M_c) = \prod_{t \in query} \frac{tf_{t,c}}{L_c}$$

Where $M_c$ is the Language Model for the predefined command "c," $M_{collection}$ is the Language Model for the collection of multiple predefined commands, $tf_{t,c}$ is the raw term frequency of word t in predefined command c and $L_c$ is the number of tokens (e.g., words) in the predefined command c. For example, the probability of the word "radio" appearing in data associated with a predefined command is calculated as: P(radio)=(number of times "radio" appears in data associated with a predefined command)/(total number of words associated with the predefined command).

If a Generative Modeling method is used, the interpretation module 144 obtains 62.9% accuracy in classifying speech data as a predefined command. As human classification of speech data as a predefined command has an accuracy of 70%, an interpretation module 144 using a Generative Modeling method approaches the upper bound on classification performance.

After classifying 420 the speech data, the interpretation module 144 determines 430 whether the speech data is associated with a single predefined command or whether two or more predefined commands are potentially associated with the speech data. In one embodiment, the interpretation module 144 identifies the predefined command having the highest probability of being associated with the speech data and the predefined command having the second-highest probability of being associated with the speech data. The margin between the highest probability of being associated with the speech data and the second-highest probability of being associated with the speech data is computed and compared to a threshold. If the margin between the probabilities exceeds the threshold, the interpretation module 144 determines 430 that the speech data matches the predefined command associated with the highest probability, which is then retrieved from the classification module 142 and is executed 440 by the computing device 100.

Responsive to determining 430 that the speech data potentially matches more than one predefined command, the interpretation module requests 445 clarification of the speech data from the user supplying the speech data. For example, if the margin between the highest probability of being associated with the speech data and the second-highest probability of being associated with the speech data does not exceed the threshold, the interpretation module 144 determines 430 that the speech data is potentially associated with the predefined command associated with the highest probability and the predefined command associated with the second-highest probability. The interpretation module 144 then requests 445 clarification of the appropriate predefined command by prompting the user to select between the potential commands. For example, the computing device 110 aurally or visually presents the possible predefined commands to a user using the output device 130 and requests 445 the user to choose the desired predefined command. After receiving 450 clarification of the appropriate command, for example by receiving speech data via the speech recognition module 160 associated with the desired predefined command, the computing device retrieves the desired predefined command from the predefined command store 142 and executes 440 the desired predefined command.

For example, the speech recognition module 160 receives 410 the speech data "I need some books." The interpretation module 144 then classifies 420 the speech data as having a probability of 0.55 of being associated with the predefined command of "find nearest bookstore" and having a probability of 0.45 of being associated with the predefined command of "find nearest bookstore." By computing the difference between the two probabilities as 0.1, the interpretation module 144 determines 430 that the speech data "I need some books" is potentially associated with either "find nearest bookstore" or "fined nearest library." The interpretation module 144 then requests 445 the user to select between the "find nearest bookstore" and "find nearest library." For example, the interpretation module 144 uses the output device 130 to generate an audio signal asking the user "Do you want to find nearest library or bookstore." Responsive to receiving 450 input from the user selecting one of the prompted commands, the predefined command is retrieved from the predefined command store 142 and executed.

In one embodiment, the interpretation module 144 stores a record of used predefined commands and uses this predefined command history to determine the desired predefined command when speech data is potentially associated with more than one predefined command. This allows the interpretation module 144 to track the current state to determine the best question with which to request 445 determination of the desired command. In one embodiment, the interpretation module 144 applies a sequential decision making method where multiple command hypotheses are maintained at each stage for use in determining whether the probability of the speech data being associated with a particular predefined command exceeds a threshold value.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A computer-implemented method for classifying speech data including one or more words, the method comprising the steps of:
    storing a plurality of predefined commands, each predefined command including one or more words and each predefined command associated with an action;
    receiving one or more alternate formats associated with each predefined command from a data source, each alternate format including one or more words and an identifier associating the alternate format with a predefined command;
    for each predefined command, representing the predefined command with a sparse vector comprising the term frequency-inverse document frequency ("TFIDF") weights for each word of the predefined command and the one or more alternate formats associated with the predefined command;
    receiving the speech data;
    generating a term frequency vector associated with the speech data;
    determining, for each predefined command, the probability that the speech data is associated with the predefined command based on the sparse vector associated with each predefined command and the term frequency vector associated with the speech data;
    associating the speech data with a predefined command based on the determined probabilities; and
    executing the action associated with the predefined command associated with the speech data.

2. The computer-implemented method of claim 1, wherein the data source comprises a website including data obtained from one or more sources using distributed data capture techniques.

3. The computer-implemented method of claim 1, wherein the data source comprises a lexical database including one or more words and one or more synonyms associated with each word.

4. The computer-implemented method of claim 1, wherein the data source comprises a website including data obtained from one or more sources using distributed data capture techniques and a lexical database including one or more words and one or more synonyms associated with each word.

5. The computer-implemented method of claim 1, wherein the determined probability is based on a cosine similarity value between the term frequency vector associated with the speech data and a sparse vector associated with a predefined command.

6. The computer-implemented method of claim 1, wherein determining the probability that a predefined command is associated with the speech data comprises:
    applying a Naïve Bayes model to the term frequency vector associated with the speech data and each sparse vector associated with a predefined command to determine a probability of each of predefined command being associated with the speech data.

7. The computer-implemented method of claim 1, wherein determining the probability that a predefined command is associated with the speech data comprises:
    calculating a probability that each sparse vector associated with a predefined command includes the term frequency vector associated with the speech data using a unigram model.

8. The computer-implemented method of claim 7, wherein the unigram model mixes a sparse vector associated with the predefined command and the set of sparse vectors according to a mixing parameter.

9. The computer-implemented method of claim 1, wherein associating the speech data with a predefined command comprises:
    determining a largest probability associated with a first predefined command;
    determining a second largest probability associated with a second predefined command;
    calculating a difference between the largest probability and the second largest probability;
    responsive to the difference not exceeding a threshold value, generating a request for an input selecting the first predefined command or the second predefined command; and
    associating the speech data with the first predefined command or the second predefined command responsive to the input.

10. The computer-implemented method of claim 9, wherein associating the speech data with a predefined command further comprises:
    responsive to the difference exceeding the threshold value, associating the speech data with the first predefined command.

11. The computer-implemented method of claim 1, further comprising:
    generating a language model for each predefined command;
    generating a language model for the set of predefined commands; and
    determining, for each predefined command, the probability that the speech data is associated with the predefined command further based on an estimation of the probability that each term in the term frequency vector associated with the speech data is associated with the predefined command based on the language model for the predefined command and the language model for the set of predefined commands.

12. A computer program product, comprising a non-transitory computer readable storage medium storing computer executable code classifying speech data including one or more words, the computer executable code performing the steps of:
  storing a plurality of predefined commands, each predefined command including one or more words and each predefined command associated with an action;
  receiving one or more alternate formats associated with each predefined command from a data source, each alternate format including one or more words and an identifier associating the alternate format with a predefined command;
  for each predefined command, representing the predefined command with a sparse vector comprising the term frequency-inverse document frequency ("TFIDF") weights for each word of the predefined command and the one or more alternate formats associated with the predefined command;
  receiving the speech data;
  generating a term frequency vector associated with the speech data;
  determining, for each predefined command, the probability that the speech data is associated with the predefined command based on the sparse vector associated with each predefined command and the term frequency vector associated with the speech data;
  associating the speech data with a predefined command based on the determined probabilities; and
  executing the action associated with the predefined command associated with the speech data.

13. The computer program product of claim 12, wherein the data source comprises a website including data obtained from one or more sources using distributed data capture techniques.

14. The computer program product of claim 12, wherein the data source comprises a lexical database including one or more words and one or more synonyms associated with each word.

15. The computer program product of claim 12, wherein the data source comprises a website including data obtained from one or more sources using distributed data capture techniques and a lexical database including one or more words and one or more synonyms associated with each word.

16. The computer program product of claim 12, wherein the determined probability is based on a cosine similarity value between the term frequency vector associated with the speech data and a sparse vector associated with a predefined command.

17. The computer program product of claim 12, wherein determining the probability that a predefined command is associated with the speech data comprises:
  applying a Naïve Bayes model to the term frequency vector associated with the speech data and each sparse vector associated with a predefined command to determine a probability of each of predefined command being associated with the speech data.

18. The computer program product of claim 12, wherein determining the probability that a predefined command is associated with the speech data comprises:
  calculating a probability that each sparse vector associated with a predefined command includes the term frequency vector associated with the speech data using a unigram model.

19. The computer program product of claim 18, wherein the unigram model mixes a sparse vector associated with the predefined command and the set of sparse vectors according to a mixing parameter.

20. The computer program product of claim 12, wherein associating the speech data with a predefined command comprises:
  determining a largest probability associated with a first predefined command;
  determining a second largest probability associated with a second predefined command;
  calculating a difference between the largest probability and the second largest probability;
  responsive to the difference not exceeding a threshold value, generating a request for an input selecting the first predefined command or the second predefined command; and
  associating the speech data the first predefined command or the second predefined command responsive to receiving the input.

21. The computer program product of claim 20, wherein associating the speech data with a predefined command further comprises:
  responsive to the difference exceeding the threshold value, associating the speech data with the first predefined command.

22. The computer program product of claim 12, the computer executable code further performing the steps of:
  generating a language model for each predefined command;
  generating a language model for the set of predefined commands; and
  determining, for each predefined command, the probability that the speech data is associated with the predefined command further based on an estimation of the probability that each term in the term frequency vector associated with the speech data is associated with the predefined command based on the language model for the predefined command and the language model for the set of predefined commands.

23. A system for classifying speech data received by a vehicle navigation system comprising:
  a predefined command store including a plurality of predefined commands, each predefined command including one or more words and each predefined command associated with an action modifying a vehicle system;
  an external data source including one or more alternate formats associated with each predefined command, each alternate format including one or more words and an identifier associating the alternate format with a predefined command;
  a sparse vector module configured to, for each predefined command, represent the predefined command with a sparse vector comprising the term frequency-inverse document frequency ("TFIDF") weights for each word of the predefined command and the one or more alternate formats associated with the predefined command;
  a speech recognition module for receiving the speech data and generating a term frequency vector associated with the speech data; and
  an interpretation module coupled to the predefined command store, the external data source and the speech recognition module, the interpretation module for receiving the term frequency vector associated with the speech data, determining for each predefined command the probability that the speech data is associated with a predefined command based on the sparse vector associated with the predefined commend and the term frequency vector associated with the speech data, and associating the speech data with a predefined command responsive to the determined probabilities.

24. The system of claim 23, wherein the data source comprises a website including data obtained from one or more sources using distributed data capture techniques.

25. The system of claim 23, wherein the data source comprises a lexical database including one or more words and one or more synonyms associated with each word.

26. The system of claim 23, wherein the data source comprises a website including data obtained from one or more sources using distributed data capture techniques and a lexical database including one or more words and one or more synonyms associated with each word.

27. The system of claim 12, further comprising a generative modeling module configured to:

generate a language model for each predefined command;

generate a language model for the set of predefined commands; and determine, for each predefined command, the probability that the speech data is associated with the predefined command further based on an estimation of the probability that each term in the term frequency vector associated with the speech data is associated with the predefined command based on the language model for the predefined command and the language model for the set of predefined commands.

* * * * *